Sept. 27, 1960  A. S. VOLPIN  2,954,044
AUTOMATIC LUBRICANT SEALED GATE VALVE
Filed Jan. 11, 1956  5 Sheets-Sheet 5

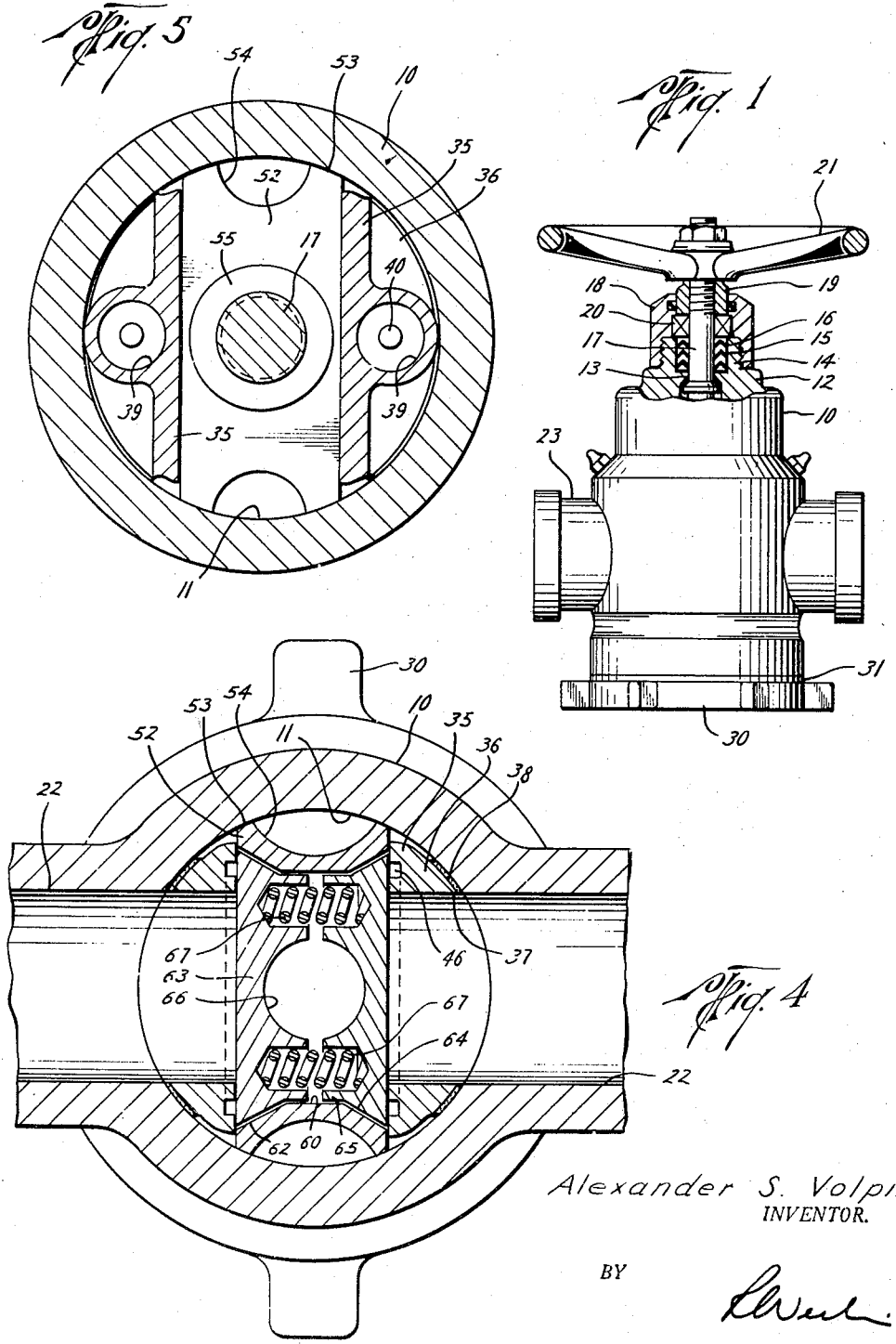

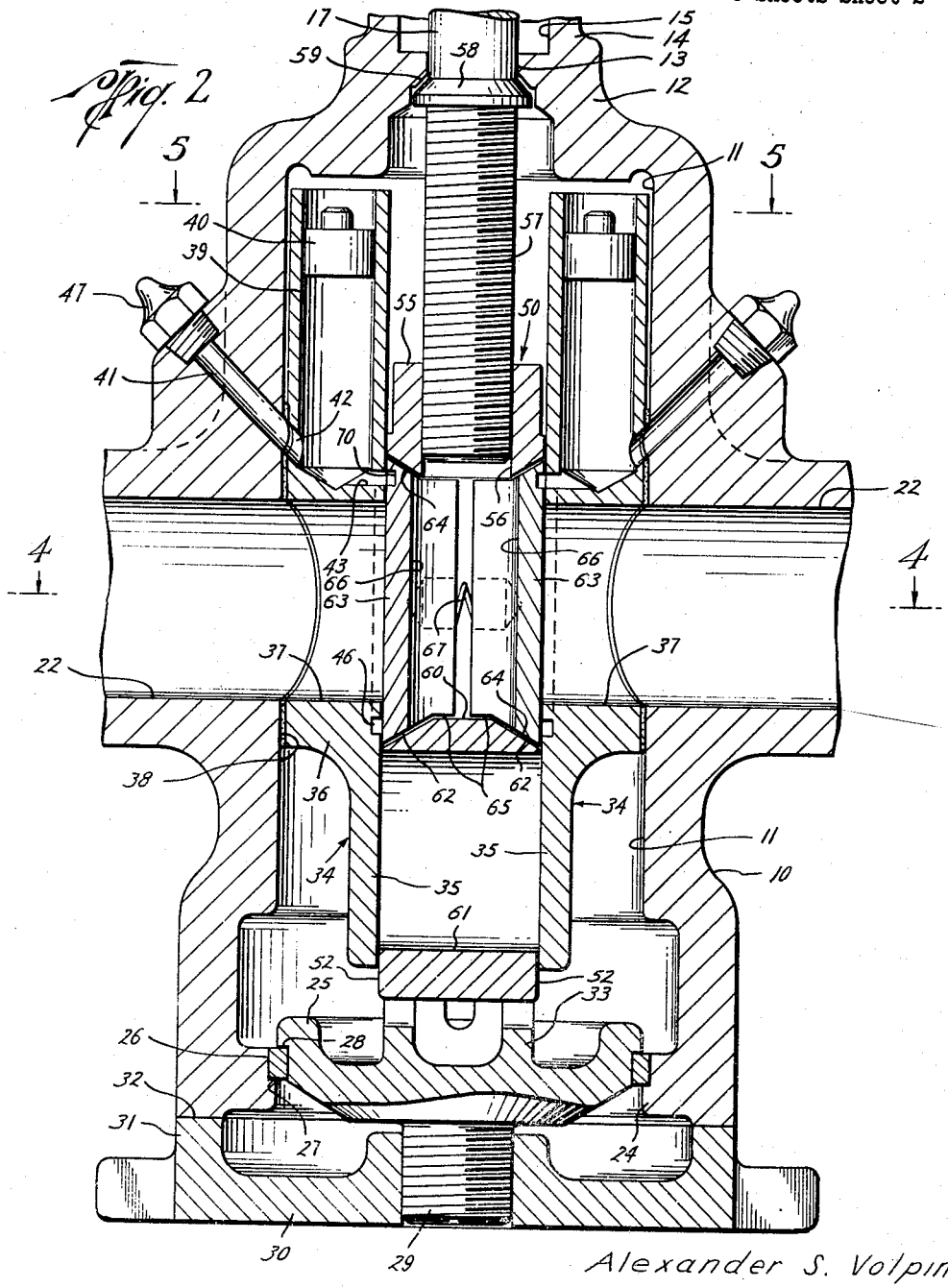

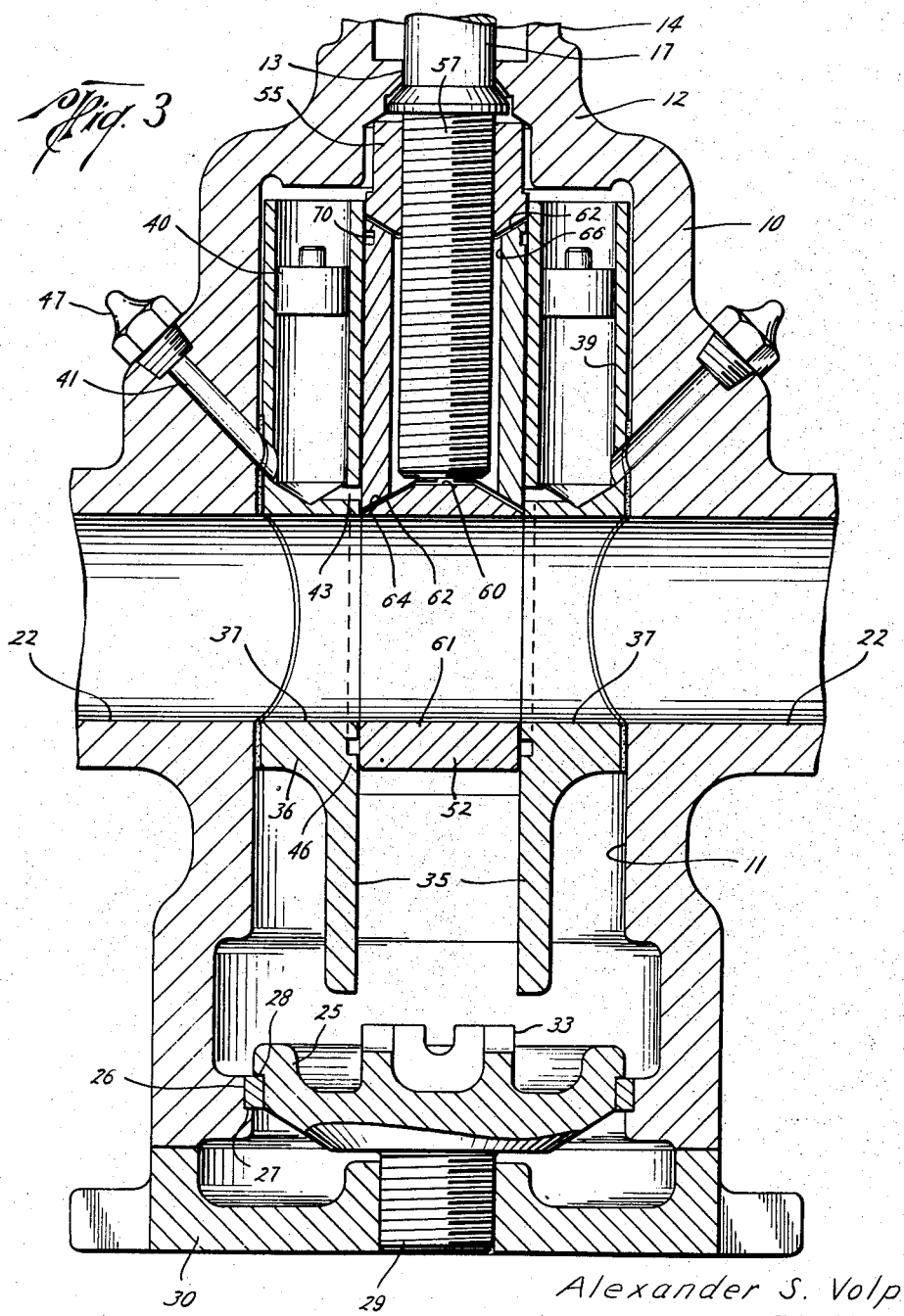

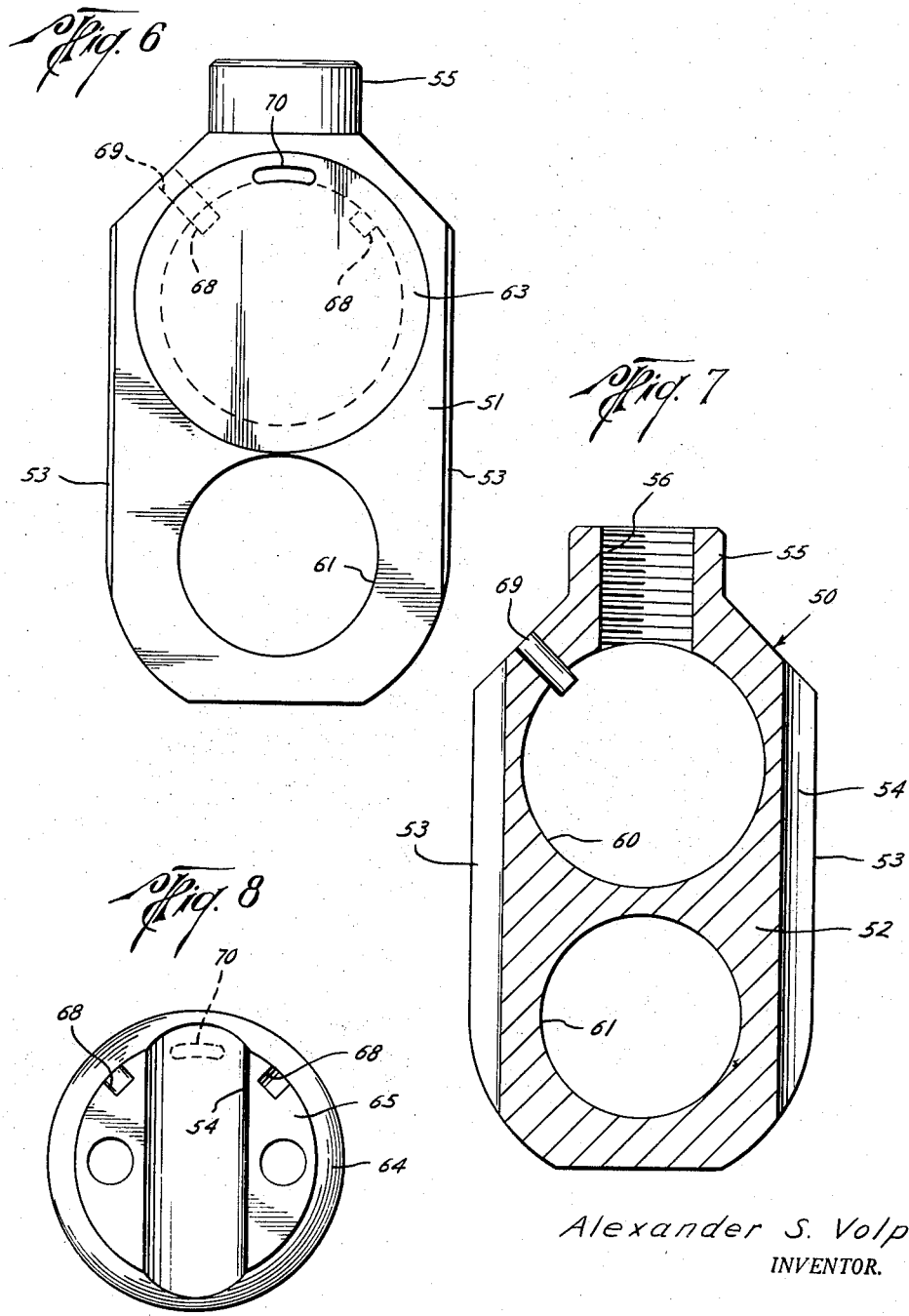

Alexander S. Volpin
INVENTOR.

BY

ATTORNEY

United States Patent Office

2,954,044
Patented Sept. 27, 1960

2,954,044

AUTOMATIC LUBRICANT SEALED GATE VALVE

Alexander S. Volpin, 9955 E. Bay Harbor Drive, Miami Beach, Fla.

Filed Jan. 11, 1956, Ser. No. 558,493

3 Claims. (Cl. 137—246.12)

This invention relates to gate valves, particularly automatic lubricant-sealed gate valves of the through-conduit type.

A primary object of the present invention is to provide an improved construction for lubricant-sealed gate valves which assures better mating for the sealing surfaces for automatic lubrication.

An important object is to provide in automatic lubricant sealed gate valves a gate construction employing closure disks which are movably seated in the gate in an arrangement which obviates transfer of stem torque to the sealing elements of the gate and thereby assures better mating of the sealing surfaces.

An additional object is to provide a gate valve construction wherein the gate chamber in the valve body is generally cylindrical, whereby the wall thereof may form guiding surfaces slidably engageable directly by the side edges of the gate to obviate lateral shifting of the gate during movement thereof.

A further object is to provide, in automatic lubricated gate valves, a through-conduit gate construction having a pair of closure disks movably seated in the opposite end portions of one of the gate openings, the end portions of the opening and the contiguous peripheral portions of the disks having complementary tapered seating surfaces adapted to permit limited degree of adjustment movement of the disks sufficient to compensate for stem torque on the gate.

Still another object is to provide an automatic lubricated gate valve construction in which the valve body has a generally cylindrical gate chamber and gate seats having arcuate outer faces adapted to seat snugly against opposite sides of the chamber about flow ports opening therethrough, said gate seats having longitudinally extending inner faces defining flat seat surfaces about the flow ports and forming guides for the reciprocation of the gate therebetween.

One of the important objects of this invention is to provide a low cost gate valve construction by providing a generally cylindrical gate chamber in the body into which are inserted gate seats having arcuate outer faces complementary in shape to the segments of the chamber wall surrounding the flow ports opening therethrough, the arcuate faces of the gate seats being metal bonded directly to the chamber wall, thereby eliminating the expensive counterboring of the body more conventionally employed for providing anchoring sockets or recesses for the gate seats.

Other and more specific objects and advantages of this invention will become more apparent from the following detailed description when read in conjunction with the accompanying drawing which illustrates one useful embodiment in accordance with this invention.

In the drawing:

Fig. 1 is an elevational view of a gate valve in accordance with this invention, the stem packing elements being shown in section;

Fig. 2 is a longitudinal sectional view of the valve showing the gate and closure elements in the valve closing position;

Fig. 3 is a view similar to Fig. 2 showing the gate and closure elements in the valve opening position;

Fig. 4 is a cross-sectional view along line 4—4 of Fig. 2;

Fig. 5 is a cross-sectional view along line 5—5 of Fig. 2;

Fig. 6 is a side elevation of the gate member having the closure disks in place therein;

Fig. 7 is a longitudinal sectional view of the gate member, the closure disks being removed from the gate;

Fig. 8 is a rear elevational view of one of the closure disks.

Figure 9:
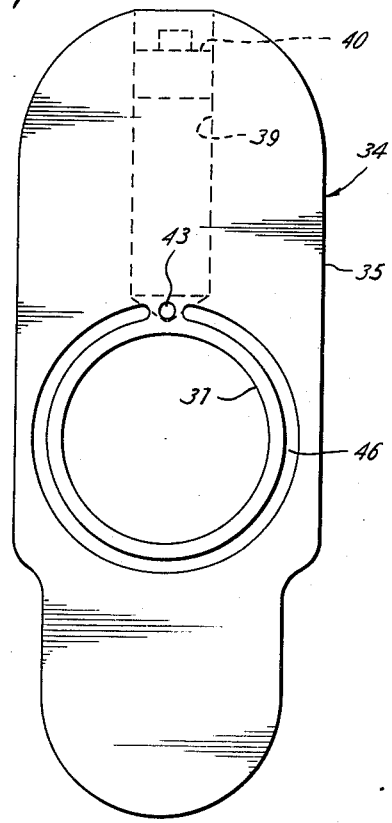
Fig. 9 is an elevational view of the inner face of one of the gate seats.
Figure 10:
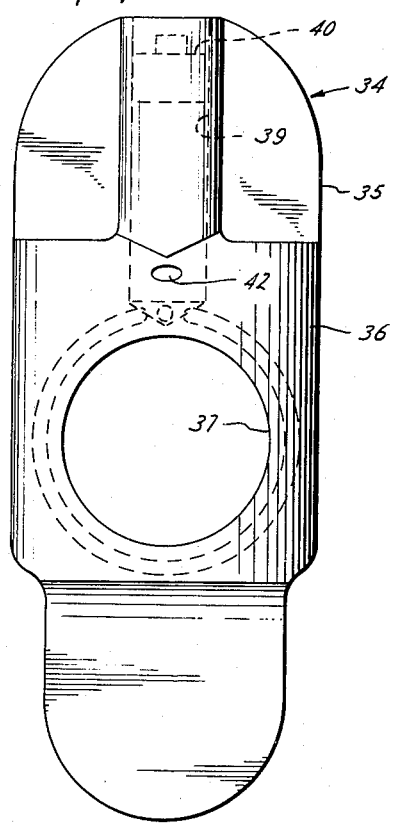
Fig. 10 is an elevational view of the outer face of one of the gate seats.
Figure 11:
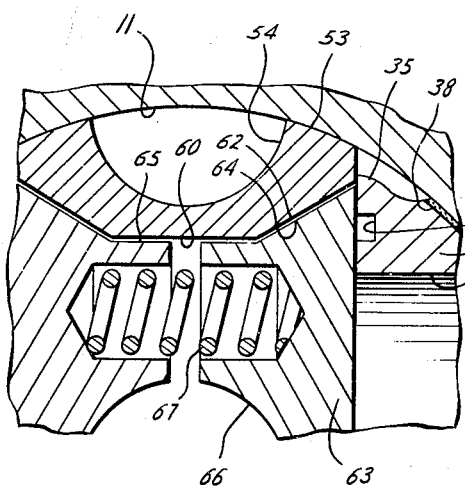
Fig. 11 is an enlarged sectional view of some of the details of the gate and closure elements.

Referring to the drawing, the valve includes a generally tubular body 10 which may be fabricated to include an integral bonnet portion 12 closing one end thereof. The interior of the body is formed or machined to provide a generally cylindrical gate chamber 11 extending longitudinally thereof and opening to substantially its full diameter through the end of the body opposite bonnet portion 12. The latter is provided with a stem-receiving opening 13 extending axially of the body and communicating with the upper end of gate chamber 11. Bonnet portion 12 is extended to form a tubular neck 14 adapted to provide a stuffing box 15 (Fig. 1) to receive stem packing 16 surrounding a stem 17 which extends through opening 13. Neck 14 is externally threaded to receive a cap 18 which closes the stuffing box and encases the usual stem drive nut 19 and bearing 20. An operating wheel 21 is suitably secured to the upper end of the stem.

Body 10 is provided intermediate its ends with flow ports 22—22 which communicate with the interior of gate chamber 11 at diametrically opposite points therein. It will be understood that either of the flow ports may constitute the valve inlet and the other the valve outlet, the valve being entirely symmetrical in its general form.

The lower end of the wall of chamber 11 is provided with an inwardly projecting annular flange 24 adapted to form a seat for a closure plug 25 of a generally conventional pressure sealing type. It will be understood that such a closure plug is dimensioned to be insertible through the bore of flange 24 into the interior of the valve body and to be urged into compressive sealing engagement with flange 24 through the medium of a metallic seal ring 26 receivable between opposed annular shoulders 27 and 28 positioned, respectively, on flange 24 and plug 25. The latter is provided with an externally threaded stem 29 which projects axially of chamber 11 to the exterior of the valve body and is adapted to threadedly receive a bridge nut 30 having an annular flange 31 abuttable with the annular face 32 on the end of body 11. It will be understood that when nut 30 is tightened on stem 29, plug 25 will be urged outwardly of chamber 11 and will thereby be compressed tightly against flange 24 through seal ring 26. Fluid pressure in the interior of chamber 11 will serve to increase the sealing pressure of the plug on flange 24. Plug 25 may be provided with an axially disposed inwardly projecting boss or projection 33 which serves as a lower limit stop for the gate element as will appear subsequently.

A pair of seat members, designated generally by the numerals 34—34, are disposed on opposite sides of chamber 11 about flow ports 22—22. As these seat members are identical in construction one will be described in detail and it will be understood that the description applies to the other.

Seat member 34 includes an elongate plate portion 35 which extends longitudinally of chamber 11 and forms a flat guide surface disposed in a plane normal to the axis of flow ports 22—22, the two seat members thereby providing parallel surfaces in spaced relation on opposite sides of gate chamber 11. Each seat member includes, also, a central outwardly projecting thickened or boss portion 36, the outer face of which is defined by a circular segment complementary to the curvature of a wall of chamber 11, whereby the seat member may be disposed in close fitting relation against the wall of the gate chamber. Boss portion 36 has a flow passage 37 extending transversely therethrough and is adapted to register with a flow port 22. The flat inner face of the plate portion surrounding the inner end of flow passage 37 defines a flat surfaced gate seat about the inner end of the flow passage. The seat member is fixedly secured directly to the wall of chamber 11 in any suitable manner, as by means of induction brazing or by flash welding 38 (Figs. 2 and 3) in a manner well understood in the metal fabricating arts. A sealant reservoir 39 of generally tubular configuration is formed in each seat member above boss portion 36 and outwardly of plate portion 35. A piston 40 is slidably disposed in the bore of the reservoir and a sealant supply channel 41 extends through the wall of body 10 into direct communication with an opening 42 extending through the outer face of boss portion 36 into reservoir 39. A sealant supply passage 43 communicates with the bottom of reservoir 39 and extends through boss portion 36 to the inner face of plate portion 35 at a point spaced slightly from flow passage 37. A circular sealing groove 46 is formed on the inner face of plate portion 35 surrounding the inner end of flow passage 37, the groove being interrupted at one point so that the ends of the groove terminate at points closely adjacent the end of passage 43 and on opposite sides thereof so that there is no direct communication between the end of passage 43 and groove 46, communication being established between passage 43 and groove 46 in a manner to be described hereinafter. The outer end of sealant supply channel 41 is provided with a conventional grease fitting 44 by which sealant material may be supplied to reservoir 39 as required.

A gate member, designated generally by the numeral 50, is slidably disposed between the flat inner faces of plate portions 35 for reciprocation in the gate chamber between the seat members. Gate member 50 includes an elongate generally rectangular body 51 having substantially flat outer faces 52—52 slidably engageable with the inner faces of plate portions 35—35. The width of gate member 50 is such that its opposite side edges 53—53 will extend into sliding engagement with diametrically opposite portions of the wall of chamber 11, this relation enabling the chamber wall to provide guiding surfaces for the longitudinal side edges of the gate member and to prevent lateral shifting of the gate in the chamber. Side edges 53 are rounded to complement the curvature of the wall of chamber 11. Longitudinal recesses 54 may be provided in the side edges 53 through which fluid pressure may be equalized throughout the interior of the gate chamber. At its upper end, gate member 50 is provided with a tubular boss 55 which is internally threaded at 56 to receive the externally threaded inner end portion 57 of stem 17. At the juncture of stem 17 and threaded portion 57, there is provided a downwardly tapered annular shoulder or flange 58 which is adapted to engage a correspondingly tapered seat 59 formed at the inner end of stem-receiving opening 13. Engagement of flange 58 with seat 59, when the stem is moved to its maximum upward position, serves to provide an additional seal about the stem to prevent escape of pressure fluid from the interior of chamber 11.

Gate member 50 is provided with upper and lower longitudinally spaced transverse passages 60 and 61, respectively. At its opposite outer ends, upper passage 60 is outwardly flared or tapered to form the generally conical seats 62—62. The maximum diameter of conical seats 62—62 at their outer ends is made somewhat less than the width of the opposing faces of plate portions 35 (see Fig. 4) so that gate faces 52—52 will always be in sliding engagement with plate portions 35. Received within the opposite ends of passage 60 are a pair of closure disks 63—63. The outer peripheral portions 64—64 of disks 63—63 are normally tapered to complement the taper of seats 62 and are dimensioned to fit somewhat loosely in the end portions of passage 60. The inner end portions 65—65 of disks 63 are generally cylindrical and dimensioned to fit, with a small amount of clearance, in the interior of passage 60. The opposing inner faces of closure disks 63 are provided with complementary semi-circular recesses 66—66 which extend longitudinally across the disks to form a channel into which the threaded end portion 57 of the gate stem may extend as the gate is moved to its upper or valve opening position, as illustrated particularly in Fig. 3. Coil springs 67—67 are arranged in compression between the inner ends of disks 63 to normally urge the disks apart and outwardly of the ends of passage 60. Inner end portions 65 of the disks may be provided with sockets 68 (Figs. 6 and 8) which are adapted to receive the inner ends of locating pins 69 (Figs. 6 and 7) which are adapted to extend through body 52 of the gate member into a socket 68 in order to anchor the closure disks against rotation about their axes while permitting a limited degree of wobble or rocking movement of the closure disks in seats 62, thereby permitting a limited degree of angular adjustment of the planes of the outer faces of closure disks 63 relative to the planes of the side faces 52 of the gate member for purposes which will be explained more fully hereinafter. Each of the closure disks is provided on its outer face at a point spaced below its upper edge with a short arcuate groove forming a by-pass channel 70 which is adapted to register with the outer end of passage 43 when the gate is in the lowermost position (Fig. 2), and to extend laterally a sufficient distance to register with and overlap the ends of groove 46 which are disposed on opposite sides of the end of passage 43.

In operation, with the gate in the closed position illustrated in Fig. 2, the gate member is in its lowermost position at which the lower end of the gate will be in engagement with boss 33, thereby limiting its downward movement and placing closure disks 63 in sealing position over the inner ends of flow passages 37. By-pass channels 70 will at this point be in registration with the ends of sealant supply passages 43 and the adjacent ends of grooves 46 so that sealant from reservoir 39 can be caused to flow through passage 43, by-pass channels 70 and into grooves 46, thereby forming seals between the inner faces of gate seat members 34 and the contiguous outer faces of closure disks 63. The force employed to flow the sealant into the sealing grooves, when the gate member is in the closed position, will be the line pressure within gate chamber 11. It will be understood that line pressure will urge the gate member slightly in the downstream direction away from the upstream seat, thereby allowing the pressure to escape to the interior of chamber 11 where this pressure will be exerted against pistons 40 to force the latter downwardly in the reservoirs 39 and thereby urge the sealant through passages 43 into the sealing grooves.

By providing the tapered seats in passage 60 and the relatively loose fitting arrangement of the closure disks therein, it will be understood that as stem 17 is rotated in lowering gate member 50 to its lowermost position, stem torque will be exerted tending to twist the gate member about the axis of the stem in the direction of rotation thereof, and that the loose fit of the closure disks, as described, will allow the closure disks to move in the seats 62 sufficiently to compensate for the twist produced by the stem torque and thereby allow the outer sealing faces of the closure disks to maintain close sealing engagement with the seat faces. In this manner registration of the several segments of the sealing grooves will be maintained and automatic lubrication and sealing will thereby be rendered fully effective.

When the gate is moved to the upper or open position, illustrated particularly in Fig. 3, the initial movement will carry by-pass channels 70 out of communication with passages 43 and grooves 46 and thereby cut off the flow of sealant to the grooves while the valve is in the open position.

By providing the cylindrical gate chamber in the body, as described, and employing the seat members with their external circular or arcuate configuration and a gate member of the form described having the arcuate side edges, it will be seen that the entire seat and gate assembly may be inserted into the body through the open lower end, thereby greatly reducing machining and installation costs and also permitting the employment of a body construction in which the bonnet portion is made integral with the body, as previously described, thereby additionally reducing the costs of construction and simplifying the structure in major respects. Furthermore, additional economies in construction costs of the valve are effected by the provision of the cylindrical gate chamber and gate seats having arcuate faces mating with the cylindrical wall segments. With this arrangement the seats may be metal bonded, as by induction brazing or flash welding, directly to the chamber wall, thereby eliminating the need for counterboring the flow ports to provide sockets or anchors for the seats as is customary in more conventional constructions.

It will be understood that numerous alterations and changes may be made in the details of the illustrative embodiment within the scope of the appended claims but without departing from the spirit of this invention.

What I claim and desire to secure by Letters Patent is:

1. A gate valve, comprising, a body having a generally cylindrical gate chamber therein, oppositely disposed flow ports in the body communicating with said chamber, gate seat members disposed on opposite sides of said chamber and having flow passageways therethrough having opposite end portions registering with said flow ports, said seat members having outer faces complementary in shape to the contiguous portions of the wall of said chamber and inner faces defining substantially flat gate seats surrounding the inner ends of said flow passageways, a generally flat elongate gate reciprocable in said chamber between said gate seats, said gate having flat sides slidably engaging said inner faces of the gate seat members and having a pair of longitudinally spaced transverse passages therethrough selectively registrable with said flow passageways by reciprocation of said gate, said gate having a width such that its opposite longitudinal side edges slidably engage diametrically opposite portions of the wall of said chamber, said side edges being generally arcuate in cross-section to complement said opposite portions of the chamber and having longitudinal channels extending throughout their length, a pair of substantially flat-faced disk-shaped closure members mounted in the opposite end portions of one of said passages to engage said gate seats whereby to close said flow passageways, said end portions and contiguous peripheral portions of said closure members having cooperable loosely fitted tapered seating surfaces adapted to permit angular adjusting movement of the closure members in said end portions relative to the plane of said gate, means resiliently urging said closure members toward said gate seats, and means forming a lubricant seal about said flow port between the engaging surfaces of said gate seats and said closure members.

2. A gate valve according to claim 1 wherein said last-mentioned means includes sealant grooves about said flow ports between said engaging surfaces, and sealant reservoirs in said seat members communicating with said grooves.

3. In a gate valve, a body having a cylindrical gate chamber therein, oppositely disposed flow ports in the body communicating with said chamber, gate seats disposed in said chamber about said flow ports, generally flat elongate gate reciprocable longitudinally of the chamber between said seats, said gate having a width such that its opposite side edges slidably engage diametrically opposite portions of the wall of said chamber, said side edges being generally arcuate in cross-section to complement said opposite portions of the chamber and having longitudinal channels extending throughout their length, said gate having a pair of longitudinally spaced transverse passages therethrough having opposite end portions selectively registrable with said flow ports by reciprocation of said gate, a pair of substantially flat-faced disk-shaped closure members mounted in the opposite end portions of one of said passages to engage the gate seats whereby to close said ports, the end portions of said one of said passages and contiguous peripheral portions of said closure members having cooperable loosely fitted tapered seating surfaces adapted to permit angular adjusting movement of the closure members in said end portions relative to the plane of said gate, resilient means urging the closure members toward the gate seats, pin members extending radially of said one of said passages from said end portions into sockets in said contiguous integral portions of the closure members forming pivots therebetween for said angular adjusting movement while preventing rotation of the closure members about their axes, and means forming a lubricant seal about said flow ports between the engaging surfaces of said gate seats and said closure members.

References Cited in the file of this patent

UNITED STATES PATENTS

| | | |
|---|---|---|
| 409,334 | Powell | Aug. 20, 1889 |
| 1,500,908 | Van Derson | July 8, 1924 |
| 1,869,741 | Du Bois | Aug. 2, 1932 |
| 2,124,334 | Gray | July 19, 1938 |
| 2,230,600 | Olson | Feb. 4, 1941 |
| 2,385,463 | Penick | Sept. 25, 1945 |
| 2,657,898 | Volpin | Nov. 3, 1953 |

FOREIGN PATENTS

| | | |
|---|---|---|
| 9,386 | Great Britain | June 27, 1888 |
| 268,267 | Great Britain | Mar. 31, 1927 |
| 112,853 | Sweden | Jan. 2, 1945 |
| 649,187 | Great Britain | Jan. 24, 1951 |
| 888,490 | Germany | Sept. 3, 1953 |